(12) United States Patent
Nilsson et al.

(10) Patent No.: US 9,155,995 B2
(45) Date of Patent: Oct. 13, 2015

(54) TREATMENT SYSTEM AND METHOD FOR A FLUE GAS FROM A COMBUSTION PROCESS

(71) Applicant: ALSTOM Technology Ltd, Baden (CH)

(72) Inventors: Lars Nilsson, Vittsjö (SE); Joergen Per-Olof Grubbström, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/315,690

(22) Filed: Jun. 26, 2014

(65) Prior Publication Data
US 2015/0010454 A1   Jan. 8, 2015

(30) Foreign Application Priority Data

Jul. 3, 2013 (EP) .................................. 13174862

(51) Int. Cl.
*B01D 53/14* (2006.01)
*B01D 53/56* (2006.01)
*B01D 53/78* (2006.01)
*B01D 53/26* (2006.01)

(52) U.S. Cl.
CPC ............... *B01D 53/56* (2013.01); *B01D 53/78* (2013.01); *B01D 53/14* (2013.01); *B01D 53/265* (2013.01); *B01D 2257/30* (2013.01); *B01D 2257/404* (2013.01); *B01D 2257/504* (2013.01); *B01D 2257/80* (2013.01); *B01D 2258/0283* (2013.01)

(58) Field of Classification Search
None
See application file for complete search history.

(56) References Cited

U.S. PATENT DOCUMENTS 4,138,470 A   2/1979  Bolme

FOREIGN PATENT DOCUMENTS

| EP | 2365866 | 9/2011 |
|---|---|---|
| WO | 2011/140054 | 11/2011 |

*Primary Examiner* — Melvin C Mayes
*Assistant Examiner* — Sheng H Davis

(57) ABSTRACT

The treatment system for a flue gas from a combustion process includes a condenser, a compressor for compressing the flue gas deprived of moisture at the condenser, a $NO_2$ scrubber column supplied with the compressed flue gas from the compressor, a liquid supply line for supplying liquid condensed at the condenser to the $NO_2$ scrubber column, and a liquid recirculation line for recirculating liquid from the $NO_2$ scrubber column to the condenser.

12 Claims, 2 Drawing Sheets

TREATMENT SYSTEM AND METHOD FOR A FLUE GAS FROM A COMBUSTION PROCESS

CROSS-REFERENCE TO RELATED APPLICATIONS

This application claims priority to European application 13174862.6 filed Jul. 3, 2013, the contents of which are hereby incorporated in its entirety.

TECHNICAL FIELD

The present invention relates to a treatment system and method for a flue gas from a combustion process.

The combustion process occurs for example in a boiler of a power plant, preferably an oxyfired boiler (i.e. a boiler supplied with oxygen instead of air).

BACKGROUND

EP 2 365 866 discloses a system for treatment of flue gas for removing $NO_x$ and $SO_2$ comprising a compressor and a wet scrubber wherein the flue gas is transported counter currently to a wash medium. In addition, between the compressor and the wet scrubber, a basic additive is supplied to limit the acidity of the water coming from the wet scrubber and thus protect the plant.

WO 2011/140 054 discloses a system for treatment of flue gas including a condenser to remove water from the flue gas, a compressor and a wet scrubber column for $NO_x$ removal. In addition, the water gathered at the condenser (this is waste water) is supplied from the condenser to the wet scrubber. According to WO 2011/140 054, after having passed through the wet scrubber, the water is collected as acid water and is disposed.

This system requires a large amount of water and, in addition generates a large amount of acid water at the wet scrubber. The present invention proposes a way to overcome these drawbacks.

SUMMARY

An aspect of the present invention includes providing a system and a method by which the water demand can be reduced.

Another aspect of the present invention includes providing a system and a method by which the acid water amount produced at the wet scrubber can be drastically reduced or completely eliminated.

These and further aspects are attained by providing a system and a method in accordance with the accompanying claims.

BRIEF DESCRIPTION OF THE DRAWINGS

Further characteristics and advantages will be more apparent from the description of a preferred but non-exclusive embodiment of the system and method, illustrated by way of non-limiting example in the accompanying drawings, in which.

DETAILED DESCRIPTION

Figure 1:
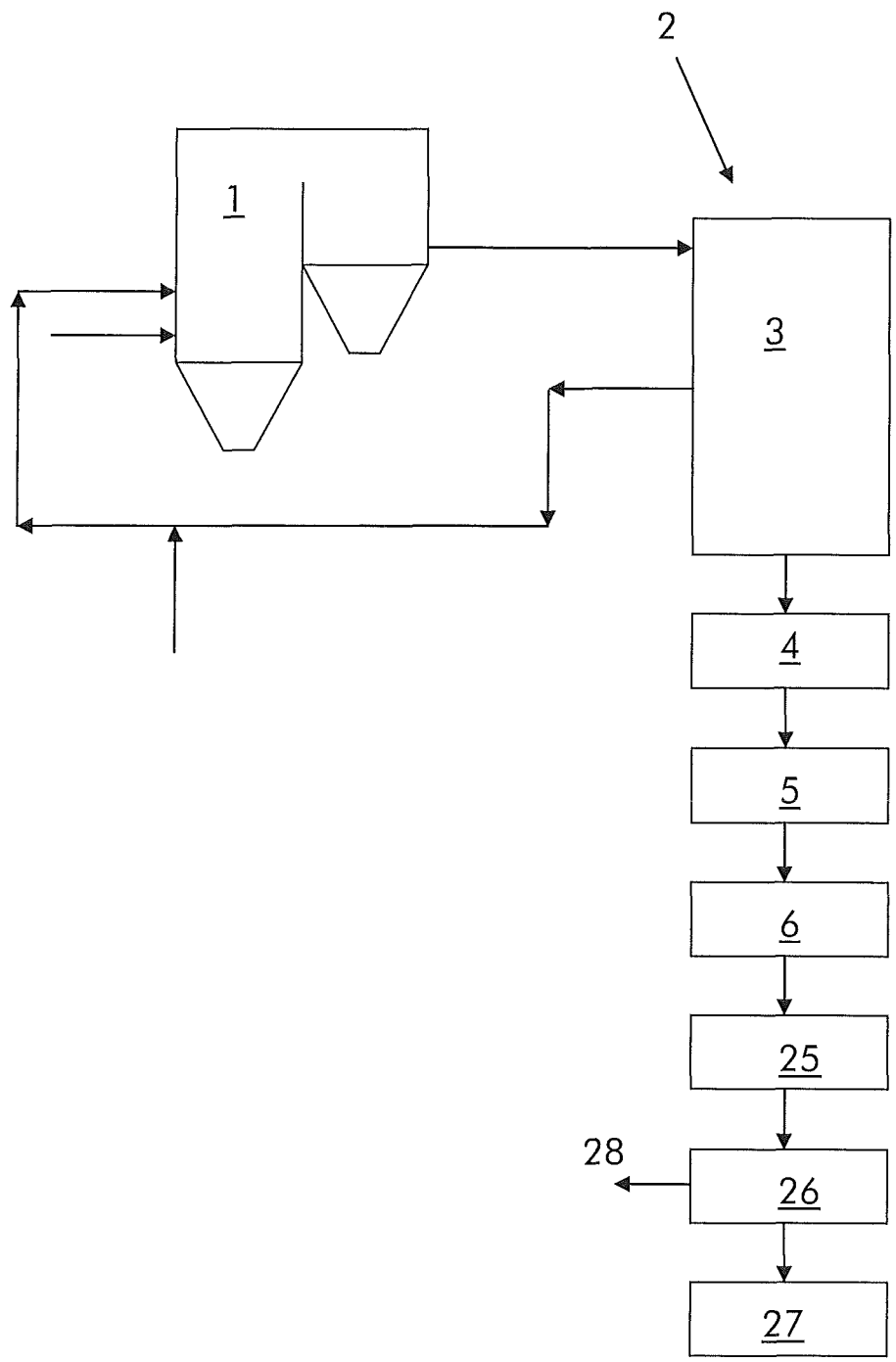
FIG. 1 is a schematic view of a system for flue gas treatment.
Figure 2:
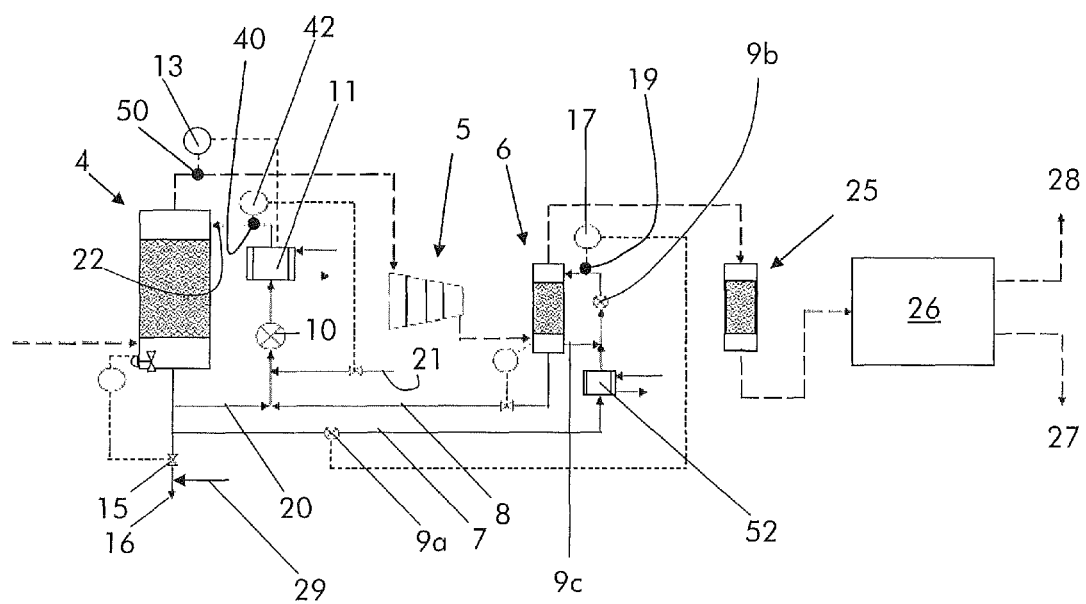
FIG. 2 is a schematic view of a system in an embodiment of the invention.

FIG. 1 shows an example of a system for a flue gas treatment.

Reference 1 indicates a boiler such as preferably an oxyfired boiler (i.e. a boiler supplied with oxygen and usually also with recirculated flue gas) and a fuel such as coal, oil or gas. The boiler 1 generates flue gas that is directed to the flue gas treatment system 2.

The flue gas treatment system 2 can have different components and the components can be differently positioned one with respect to the other, but usually the system 2 includes a filter or electrostatic precipitator for dust removal, a $SO_2$ scrubber, a diverter connected to a recirculation line for supplying a portion of the flue gas back to the boiler 1 (this recirculated gas is mixed with the oxygen) and/or other components. These components are generally identified by the reference 3.

The system also includes a condenser 4 for liquid removal. The condenser 4 can be of the type having liquid falling for the top and gas rising from the bottom thereof. The amount of liquid can be up to 40% by volume of the flue gas, thus the amount of liquid that is collected at the condenser 4 can be large.

Downstream of the condenser 4, the system 2 includes a compressor 5 for compressing the flue gas deprived of liquid at the condenser 4. The compressor 5 is usually a multi stage compressor.

The system 2 then includes a $NO_2$ scrubber column 6, which is supplied with the compressed flue gas from the compressor 5, and a liquid supply line 7 for supplying a part of the liquid condensed at the condenser 4 to the $NO_2$ scrubber column 6 (this liquid includes mainly water but it can also include other components). Also the $NO_2$ scrubber column 6 is preferably of the type having liquid falling for the top and gas rising from the bottom thereof.

In addition, the system 2 also comprises a liquid recirculation line 8 for recirculating liquid from the $NO_2$ scrubber column 6 back to the condenser 4.

On the liquid supply line 7 a feed pump 9a and usually a recirculation pump 9b are provided.

The feed pump 9a recirculates the liquid from the condenser 4 to the $NO_2$ scrubber 6 and the recirculation pump 9b recirculates the liquid from the outlet of the $NO_2$ scrubber to the inlet of the $NO_2$ scrubber through the line 9c, in case of low liquid flow from the feed pump 9a.

The system also has a main flow recirculation 20, for recirculating liquid from the outlet of the condenser 4 back to the inlet of the condenser 4.

Preferably the main flow recirculation 20 and the recirculation line 8 merge in a return line 22 that is connected to the inlet of the condenser 4.

No fresh water (or only limited amount of fresh water) needs to be supplied to the condenser 4, as the liquid supplied to the condenser 4 is extracted from the flue gas itself.

A supply 21 for reagents, such as for pH control reagents can be provided at the return line 22.

In addition, a pump 10 is preferably provided on the return line 22, to help liquid circulation and a heat exchanger 11 is also preferably provided on the return line 22, to cool the liquid that must be supplied to the condenser 4. Alternatively or in addition to the heat exchanger 11 on the return line 22, a heat exchanger can also be provided on the main flow recirculation 20.

The heat exchanger 11 can be of any type according to the cooling capacity needed and the cooling medium available; for example as cooling medium one or more of the following can be used: water (that preferably does not come into contact with the water to be cooled), air, etc. Advantageously a controller 13 for the heat exchanger 11 is provided.

The controller 13 can regulate the flue gas temperature at the outlet of the condenser 4 by regulating the heat exchanger 11 on the basis of a target temperature for the flue gas at the outlet of the condenser 4.

For example, the controller 13 can regulate the liquid temperature at the outlet of the heat exchanger 11 on the basis of a measured temperature of the flue gas (via a sensor 50) and a target temperature for the flue gas at the outlet of the condenser 4. The target temperature is defined in advance and depends on the environment and operating conditions and on the cooling fluid available.

A controller 17 for controlling the feed pump 9a is also provided; the controller 17 can regulate the feed pump 9a on the basis of at least a feature of the liquid supplied to the $NO_2$ scrubber column 6 via the supply line 7.

Different kinds of sensors can be provided to detect the features of the liquid, but preferably a sensor 19 for the pH of the liquid is provided on the liquid supply line 7. The sensor 19 is connected to the controller 17 for controlling the feed pump 9a.

The controller 17 controls the feed pump 9a in order to keep the pH of the liquid supplied to the $NO_2$ scrubber column in the range 5.5-7 and preferably 6-7.

In addition, another sensor 40 preferably for the pH of the liquid can be provided on the return line 22; the sensor 40 is connected to a controller 42 that is in turn connected to and controls the supply 21 for reagents, such as a pH control reagent.

The controllers 13 and/or 17 and/or 42 can be local or centralised controllers, for example those controllers 13, 17, 42 are separate controllers or one single control unit that implements all control functions or they can be embedded in one of the machines such as heat exchanger 11, pump 9a, supply 21.

Downstream of the $NO_2$ scrubber column 6 the system 2 has a dehydration device 25 for moisture removal, and a $CO_2$ separation system 26, to separate $CO_2$ that is supplied to a sequestration unit 27 from other gas that is vented at 28.

The system 2 also comprises a heat exchanger 52 for cooling the liquid supplied to the $NO_2$ scrubber column 6. The heat exchanger 52 is preferably on the liquid supply line 7.

The operation of the system is apparent from that described and illustrated and is substantially the following.

The flue gas generated at the boiler 1 is treated in different ways at 3 (when these treatments are provided).

Then the flue gas is supplied to the condenser 4 where moisture is condensed; the flue gas deprived of moisture is thus compressed at the compressor 5 (as a side effect this enhances conversion of NO into $NO_2$) and thus it is supplied to the bottom of the $NO_2$ scrubber column 6.

The liquid collected at the bottom of the condenser 4 is partly supplied to the inlet of the condenser 4 via the main flow recirculation 20 and it is partly supplied via the supply line 7 to the top of the $NO_2$ scrubber column 6. The liquid supplied to the $NO_2$ scrubber column 6 washes in counter flow the flue gas and removes $NO_2$ (and NO that keeps converting into $NO_2$) with high efficiency.

Liquid is collected at the bottom of the $NO_2$ scrubber column 6. From the $NO_2$ scrubber column 6 the liquid is supplied via the recirculation line 8 and main flow recirculation and through the pump 10 to the heat exchanger 11 and thus to the inlet of the condenser 4.

The sensor 19 measures the pH of the liquid in the supply line 7 and supplies the information on the pH to the controller 17. The controller 17 regulates the feed pump 9a such that the pH of the liquid in the supply line 7 is in the target range, i.e. between 5.5-7 and preferably 6-7. In other words, the regulation of the pump 9a is such that the acidity of the liquid at the $NO_2$ scrubber column 6 is limited by dilution.

This pH value allows operation of the system with a limited risk of corrosion and damage to the plant and its components caused by the acidity of the liquid.

In addition, the pH of the liquid is also measured by the sensor 40 close to the inlet of the liquid into the condenser 4; this information of the pH is supplied to the supply 21 through with a pH control reagent is supplied into the return line 22 for controlling and adjusting the pH of the liquid supplied into the condenser 4.

In addition a control valve 15 is provided connected to the bottom of the condenser 4 and to a liquid waste line 16.

The control valve 15 is used to dispose liquid and regulate the liquid amount at the bottom of the condenser 4; the liquid disposed via the waste line 16 has a pH around 7 and can be easily discharged. Anyhow, an additional supply 29 can be provided at the waste line 16 in order to supply an addictive to regulate the pH according to the desired pH at the waste line 16.

The flue gas from the $NO_2$ scrubber column 6 is then dehydrated at 26; thus at the $CO_2$ separation system $CO_2$ is separated from other gas and is sequestrated in 27 and other gas (for example oxygen, argon, nitrogen) are vented at 28.

The present invention also relates to treatment method for a flue gas from a combustion process. The method comprises:

passing the flue gas through a condenser 4 to condensate the moisture contained therein, compressing the flue gas deprived of moisture at a condenser 4, passing the compressed flue gas through a $NO_2$ scrubber column 6 to remove $NO_2$, supplying at least a part of the liquid condensed at the condenser 4 to the $NO_2$ scrubber column 6, recirculating at least a part of the liquid from the $NO_2$ scrubber column 6 to the condenser 4.

The method also includes regulating the flue gas temperature at the outlet of the condenser 4 by regulating the heat exchanger 11 on the basis of a target temperature for the flue gas at the outlet of the condenser 4.

In particular, according to the method the supplying of at least a part of the liquid condensed at the condenser 4 to the $NO_2$ scrubber column 6 is regulated on the basis of at least a feature of the liquid supplied to the $NO_2$ scrubber column 6. For example the at least a feature of the liquid supplied to the $NO_2$ scrubber column 6 is the pH. Preferably the feeding is regulated in order to keep the pH of the liquid supplied to the $NO_2$ scrubber column 6 in the range 5.5-7 and preferably 6-7.

The method also includes cooling the liquid supplied to the $NO_2$ scrubber column 6. Cooling preferably includes cooling the liquid supplied through the liquid supply line 7.

Naturally the features described may be independently provided from one another.

In practice the materials used and the dimensions can be chosen at will according to requirements and to the state of the art.

The invention claimed is:

1. A treatment system for a flue gas from a combustion process comprising a condenser, a compressor for compressing the flue gas deprived of moisture at the condenser, a $NO_2$ scrubber column supplied with the compressed flue gas from the compressor, a liquid supply line for supplying at least a part of the liquid condensed at the condenser to the $NO_2$ scrubber column, and a liquid recirculation line for recirculating at least a part of the liquid from the NO$_2$ scrubber column to the condenser.

2. The system according to claim 1, further comprising a feed pump for supplying liquid to the NO$_2$ scrubber column, and a controller for regulating the feed pump on the basis of at least a feature of the liquid supplied to the NO$_2$ scrubber column.

3. The system according to claim 2, further comprising at least a sensor for the pH of the liquid supplied to the NO$_2$ scrubber column.

4. The system according to claim 3, wherein the controller controls the feed pump in order to keep the pH of the liquid supplied to the NO$_2$ scrubber column in the range 5.5-7 and preferably 6-7.

5. The system according to claim 1, further comprising a heat exchanger for cooling the liquid supplied to the NO$_2$ scrubber column.

6. The system according to claim 5, wherein the heat exchanger is on the liquid supply line.

7. A treatment method for a flue gas from a combustion process comprising passing the flue gas through a condenser to condensate moisture contained therein, compressing the flue gas deprived of moisture at a condenser, passing the compressed flue gas through a NO$_2$ scrubber column to remove NO$_2$, supplying at least a part of the liquid condensed at the condenser to the NO$_2$ scrubber column, and recirculating at least a part of the liquid from the NO$_2$ scrubber column to the condenser.

8. The method according to claim 7, further comprising regulating the supplying of at least a part of the liquid condensed at the condenser to the NO$_2$ scrubber column on the basis of at least a feature of the liquid supplied to the NO$_2$ scrubber column.

9. The method according to claim 8, wherein the at least a feature of the liquid supplied to the NO$_2$ scrubber column is the pH.

10. The method according to claim 9, further comprising regulating the feeding in order to keep the pH of the liquid supplied to the NO$_2$ scrubber column in the range 5.5-7 and preferably 6-7.

11. The method according to claim 7, further comprising cooling the liquid supplied to the NO$_2$ scrubber column.

12. The method according to claim 11, further comprising cooling the liquid supplied through the liquid supply line.

* * * * *